United States Patent [19]
Ballabio et al.

[11] Patent Number: 5,541,387
[45] Date of Patent: Jul. 30, 1996

[54] LASER SYSTEM FOR DRILLING AND CUTTING REFRIGERATING COMPARTMENTS

[76] Inventors: Enzo Ballabio; Remo Sartori, both of Via Liegi 2, 24040 Zingonia (Bergamo), Italy

[21] Appl. No.: 364,691

[22] Filed: Dec. 28, 1994

[30] Foreign Application Priority Data

Dec. 29, 1993 [IT] Italy ................... MI93A2757

[51] Int. Cl.⁶ ................ B23K 26/02; B23K 26/16
[52] U.S. Cl. ..................................... 219/121.78
[58] Field of Search ............. 219/121.67, 121.82, 219/121.84, 121.78, 121.8

[56] References Cited

U.S. PATENT DOCUMENTS

| | | | |
|---|---|---|---|
| 4,374,314 | 2/1983 | Deacutis | 219/121.68 |
| 4,618,759 | 10/1986 | Müller et al. | 219/121.78 |
| 4,680,442 | 7/1987 | Bauer et al. | 219/121.67 |
| 4,694,139 | 9/1987 | Röder | 219/121.67 |
| 4,698,483 | 10/1987 | Marinoni et al. | 219/121.78 |
| 5,051,558 | 9/1991 | Sukhman | 219/121.82 |
| 5,053,602 | 10/1991 | Aharon | 219/121.78 |
| 5,340,962 | 8/1994 | Schmidt et al. | 219/121.78 |

FOREIGN PATENT DOCUMENTS

| | | | |
|---|---|---|---|
| 232548 | 8/1987 | European Pat. Off. | 219/121.82 |
| 1-306091 | 12/1989 | Japan | 219/121.82 |

*Primary Examiner*—Geoffrey S. Evans
*Attorney, Agent, or Firm*—Bucknam and Archer

[57] ABSTRACT

A laser system including a beam focalizing head that has five degrees of freedom, and electronic controller for controlling the displacement of the beam focalizing head. A template is provided for centering a refrigerating compaterment to be cut, along with a plurality of electric valves for connecting the template to a negative pressure pump to a carbon filter to filter the cutting fumes caused by the laser.

1 Claim, 2 Drawing Sheets

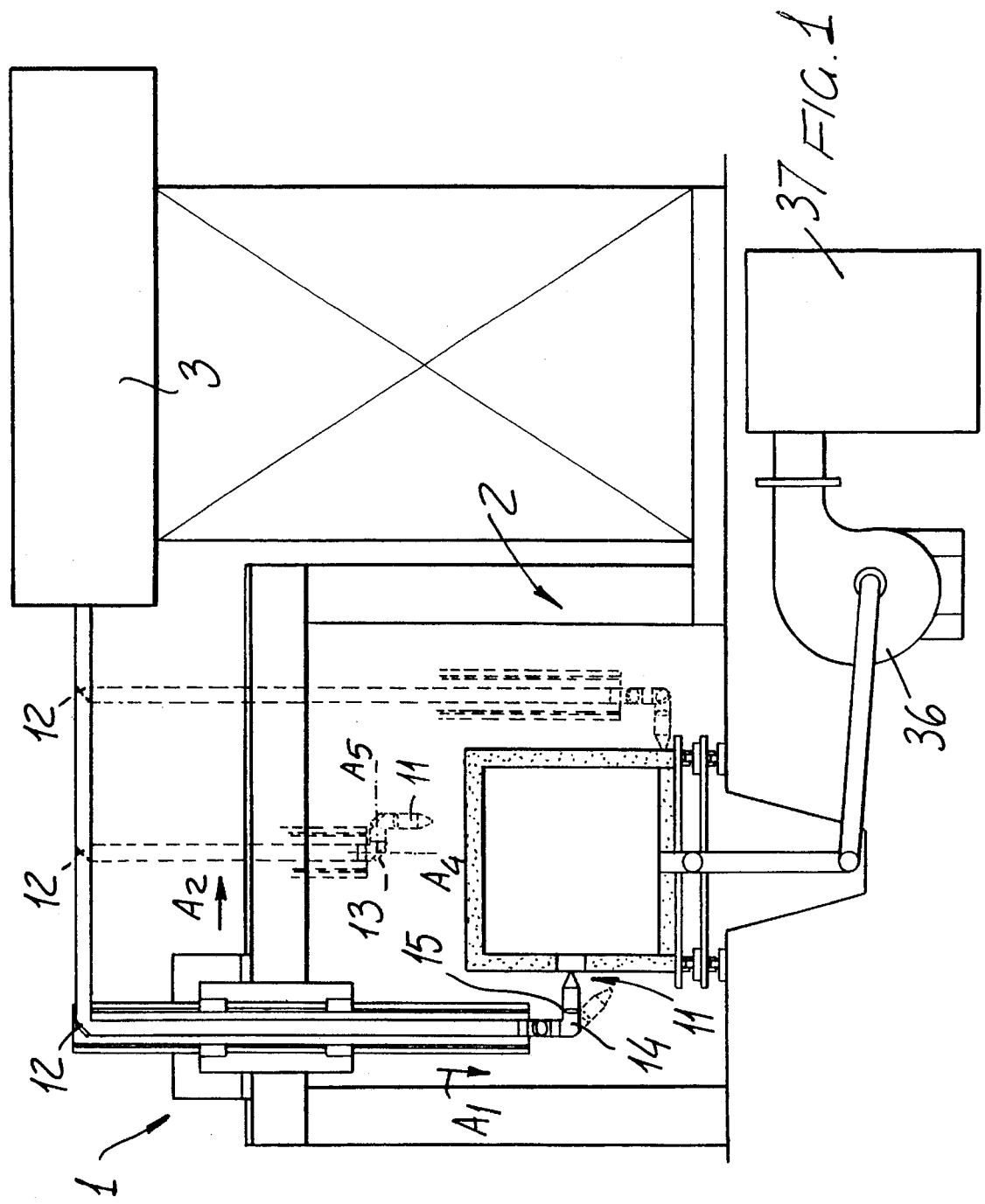

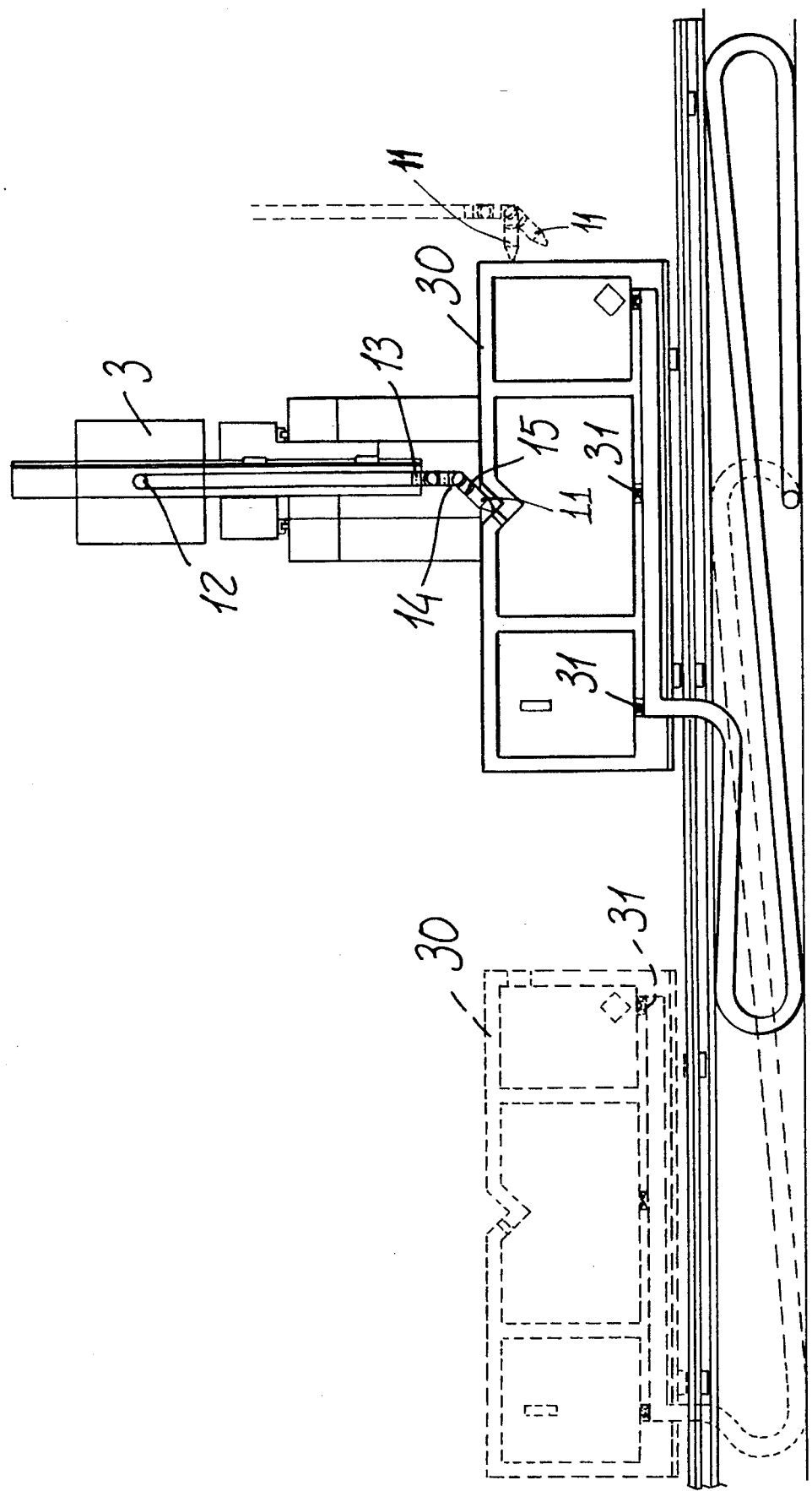

LASER SYSTEM FOR DRILLING AND CUTTING REFRIGERATING COMPARTMENTS

BACKGROUND OF THE INVENTION

The present invention relates to a system for drilling and cutting refrigerating compartments and back-doors for domestic refrigerators and the like.

As is known, in thermoforming apparatus for making refrigerating compartment walls and back-doors for domestic or home refrigerators, there are usually provided mechanical punching machines, including cutting and drilling elements for performing cutting and drilling operations on the plastic material article of manufacture.

In the case of a large-series production, this type of punching machine can represent a satisfactory solution, even if it has the drawback of including a dedicated drilling and cutting implement for each refrigerator model, thereby there is necessary a comparatively long time for replacing the single drilling and cutting implements, with a consequent very high production cost.

Moreover, as the making of the refrigerator compartments is related to improvement and personalizing requirements, it is necessary to frequently replace the cutting implements or tools, in order to meet specific marketing requirements, thereby remarkably negatively affecting the making time.

In fact, it should be apparent that to frequently adapt the drilling and cutting implements constitutes a very expensive and difficult job since it requires to replace several component parts of the apparatus.

In this connection it should be pointed out that it is not possible to perform modifications during the making step and, accordingly, it is not possible to interrupt a making operation for starting another making operation, without providing long dead times.

SUMMARY OF THE INVENTION

Accordingly, the aim of the present invention is to overcome the above disclosed drawbacks, by providing a drilling and cutting system, to be used in line in a thermoforming apparatus, for making refrigerating compartments and back-doors for domestic refrigerators and the like, which is adapted to drill and cut work-pieces in a very quick and reliable manner.

Within the scope of the above mentioned aim, a main object of the present invention is to provide such a drilling and cutting system, which affords the possibility of greating improving the quality properties of the end product, in addition to increasing the operating speed of the overall process and so as to greatly reduce the making cost.

Yet another object of the present invention is to provide such a drilling and cutting system which is very safe and reliable in operation and in which, moreover, it is easily possible to change the type of the cut being performed, without the need of replacing tools or implements, and which, moreover, can be easily made starting from easily available elements and materials and which, furthermore, is very competitive from a mere economic standpoint.

According to one aspect of the present invention, the above mentioned aim and objects, as well as yet other objects, which will become more apparent hereinafter, are achieved by a system for drilling and cutting refrigerating compartments and back-doors for domestic refrigerators, characterized in that said system comprises a laser source, coupled to a laser beam focalizing head, which can be displaced with respect to a refrigerating compartment or work-piece to be processed, so as to reach any set positions in a working region, electronic-digital control means being moreover provided, for controlling a displacement of said laser beam focalizing head.

BRIEF DESCRIPTION OF THE DRAWINGS

Further characteristics and advantages of the invention will become more apparent from the following detailed disclosure of a preferred, though not esclusive, embodiment of a system for drilling and cutting refrigerating compartments and back-doors for domestic or home refrigerators and the like, which is illustrated, by way of an indicative, but not limitative, example, in the accompanying drawings, where:

FIG. 1 is a schematic side view illustrating the system according to the present invention; and FIG. 2 illustrates a detail of a template providing for containing the refrigerating compartments and the laser beam focalizing head.

DESCRIPTION OF THE PREFERRED EMBODIMENTS

With reference to the number references of the above mentioned figures, the system for drilling and cutting refrigerating compartments and back-doors for domestic refrigerators and the like according to the present invention, which has been generally indicated at the reference number 1, comprises a bearing framework 2, thereon is mounted a laser source 3.

Said source laser, as shown, is coupled to a laser beam focalized head, indicated at the reference number 11, through the interposition of a first optical assembly 12, for displacing the laser beam, which is adapted to deflect said laser beam to a second optic laser beam deflecting assembly 13, provided in a focalizing assembly 14, including a focalizing lens 15.

In this connection, a very important feature of the subject system is that it has five movement degrees and, in particular: the first movement degree, indicated by the arrow A1, is a longitudinal direction displacement; the second movement degree, indicated by the arrow A2, is a cross displacement; the third movement degree is a vertical displacement A3 of the laser beam focalizing head 11, which is connected to a supporting arm therefor, so as to rotate both about a vertical axis A4 and about a horizontal axis A5, so that the laser beam focalizing head can be displaced to any desired working position.

The displacements of the laser beam focalizing head, in particular, are controlled by electronic digital controlling means, affording the possibility of precisely locating the laser beam focalizing head at any desired working position.

The subject cutting system is precisely timed with the several making operations of refrigerating compartments, by means of a loading assembly, which can be either of a manual or of an automatic type, which is adapted to take up the refrigerating compartments and locate it on a template 30, which can be displaced along longitudinally extending guides or rails, for allowing said assembly to be displaced in the direction A1.

The template is specifically provided to allow the refrigerating compartment to be precisely centered, so as to afford the possibility of accurately perform all of the subsequent cutting operation thereon.

Said template is moreover connected, through electrical valves 31, to a suction assembly, including a negative pressure pump 36 which conveys the sucked air to an activated carbon decanting assembly 37, for filtering the cutting sucked fumes, so as to bring them to an inert condition.

With such an arrangement, an user can easily modify the cutting type, without the need of changing tools, but by simply modifying the programming of the above mentioned electronic digital controlling means, so as to perform, in a very quick manner, a plurality of cutting programmed operations.

From the above disclosure it should be apparent that the invention fully achieves the intended aim and objects.

In particular, the fact is to be pointed out that a cutting system has been provided which allows to easily modify, within a broad range, the type of cutting or drilling operations to be performed, without any dead time.

The invention, as disclosed, is susceptible to several variations and modifications, all of which will come within the inventive idea scope.

Moreover, all of the details can be replaced by other technically equivalent elements.

In practicing the invention, the used materials, provided that they are compatible to the intended use, as well as the contingent size and shapes can be any, depending on requirements.

We claim:

1. A system for drilling and cutting refrigerating compartments and back-doors for refrigerators, comprising a fixed laser source, coupled to a laser beam focalizing head, which can be displaced with respect to a refrigerating compartment to be processed, so as to reach any set positions in a working region, electronic digital control means for controlling displacement of said laser beam focalizing head, said laser beam focalizing head being provided with five movement degrees, including a displacement movement along a longitudinal direction, a displacement movement along a cross direction, a displacement movement along a vertical direction, a rotation movement along a vertical axis and a rotation movement along a horizontal axis, wherein said fixed laser source is coupled to said laser beam focalizing head by a first optical deflecting assembly and a second optical deflecting assembly, said second optical deflecting assembly including a focalizing lens for focalizing into a single point said laser beam, and wherein said system further comprises a template means for centering said refrigerating compartment, said template means being slidably supported on longitudinal guides to be driven along a longitudinal direction, a negative pressure pump for sucking cutting fumes, coupled to an activated carbon filter, and a plurality of electric valves for connecting corresponding regions of said template means to communicate with said negative pressure pump.

\* \* \* \* \*